United States Patent [19]

Massau

[11] 4,353,608
[45] Oct. 12, 1982

[54] SYSTEM OF COLLECTORS FOR CONDUITS IN A DWELLING

[76] Inventor: Julien G. Massau, Genistroit, 132, 1348 Louvain-la-Neuve, Belgium

[21] Appl. No.: 160,789

[22] Filed: Jun. 19, 1980

[30] Foreign Application Priority Data

Jun. 21, 1979 [BE] Belgium .................................. 195.874

[51] Int. Cl.³ ...................... H01R 39/00; H01R 39/14
[52] U.S. Cl. .................................... 339/2 R; 339/8 R; 52/65
[58] Field of Search ............................ 52/65; 285/190; 137/357; 339/2 R, 2 A, 5 R, 5 M, 8 R

[56] References Cited

U.S. PATENT DOCUMENTS 3,636,975  1/1972  Kirkman et al. ................... 52/65 X
3,933,400  1/1976  Helgeson ............................ 52/65 X

FOREIGN PATENT DOCUMENTS 606989  5/1978  U.S.S.R. .................................. 52/65

Primary Examiner—Eugene F. Desmond

Attorney, Agent, or Firm—Sughrue, Mion, Zinn, Macpeak and Seas

[57] ABSTRACT

A system of individual and easily deconnectable collectors for the passage of fluids and electric cables in a dwelling comprising an inhabitable assembly which can rotate or revolve. Each circuit (fluid conduit or cable duct) is associated with a separate collector, of general annular shape, comprising two rings adapted and connected to each other so as to define at least one annular chamber therebetween, the first ring being fixed and integrally mounted on the fixed central spindle of the dwelling and the second ring being integrally connected to the rotating or revolving inhabitable assembly and said second ring being mounted so as to be capable of moving relative to the first ring. Said first ring is provided with at least one transverse passage by which each annular chamber communicate with a respective fixed conduit or duct. The second ring is also provided with at least one transverse passage by means of which each annular chamber communicates with a respective conduit or duct of the rotating or revolving assembly.

7 Claims, 16 Drawing Figures

SYSTEM OF COLLECTORS FOR CONDUITS IN A DWELLING

BACKGROUND OF THE INVENTION

This invention relates to a system of collectors for various conduits for the passage of fluids and electric cables in a dwelling comprising an inhabitable assembly which rotates or revolves.

One of the chief problems which arises in the erection and fitting out of revolving dwellings is that of the passage and connection of the conduits for supplying fluids (drinking water and domestic water, liquid or gaseous fuel) to the revolving dwelling areas, and for the discharge of waste water and for the passage of electric cables (distribution of mains electric current, telephone lines, television lines, for example).

To solve this general problem, it is essential to provide solutions particularly to the following three technical problems. A first problem is the heat insulation which has to be provided between the conduits for different fluids. For example, there has to be perfect heat insulation between a conduit supplying cold water and one supplying domestic hot water or one supplying heating fluid. This is a thermal problem connected with the comfort required in the dwelling.

A second problem is that of the independence and autonomy of different types of conduits. In a dwelling, in fact the following have to be provided, for example: a supply of cold water, a supply of domestic hot water, a supply of hot water or fluid for heating, an outlet for waste water or sewage, a supply of gas for kitchen stoves, a supply of electricity, telephone and television lines and, optionally, in more specific applications: one or more supplies of drinks (beer, soft drinks, wine on draught), a supply of fluid for refrigerators, a supply of compressed air, etc. With multiple distribution circuits of this kind, it is unthinkable that, if there is a breakdown or defect of some kind in one of the circuits, it should be necessary to switch off and therefore temporarily put all the circuits out of action and call in all the specialist services such as the plumber, heating engineer, electrician, telephone engineer, etc. Therefore, it is essential to design a system which ensures absolute independence and autonomy of all the circuits and a system which readily permits access to and enables the disconnection of a particular individual circuit.

Finally, a third problem is that of the possibility of adapting the system to particular applications, both when the dwelling is erected and at a later stage, if any modifications or extensions are made.

Certainly, there is already an apparatus, known as a rotary joint, which provides a means for supplying water and a liquid fuel or for evacuating waste water or sewage in a revolving dwelling. This apparatus is described in Belgian Pat. No. 642.617. The apparatus consists of a stuffing-box with concentric cylindrical cages which gives an axial flow, but this apparatus does not provide adequate insulation between the parallel circuits, with the result that it is hardly suitable for the simultaneous passage of cold water and hot water, for example, since the cold water would be heated by the stagnation of hot water or fluid in the cages. Moreover, this known apparatus in no way meets the requirements regarding the autonomy of the circuits and is not really suitable for the passage of multiple circuits, and in any case it would rapidly become too bulky for these multiple circuits, to the point where it would even constitute an obstacle to the fitting out of a revolving dwelling with a single central access, since it would encroach over too great an area of the dwelling space. Moreover, this apparatus cannot meet the requirements of adaptability to particular applications.

Nor is this known apparatus suitable for the passage of electric cables. Admittedly, there are rotary electrical connectors for this purpose, comprising rings and brushes mounted in a casing. However, this type of apparatus is not suitable for revolving dwellings, as the apparatus would have to be sent back to the factory if a ring or brush had to be added, and this is totally out of the question in practice. It is therefore necessary to have an apparatus which ensures perfect autonomy of the different electric circuits, i.e. the mains supply, telephone and television lines, etc.

To sum up, the technical problems involved in the passage of multiple conduits in revolving dwellings have not hitherto been totally resolved in a satisfactory manner. The invention sets out precisely to solve these problems and provide an overall practical solution for the passage of conduits in a revolving dwelling.

SUMMARY OF THE INVENTION

According to the invention, these problems are solved by a system of collectors comprising a fixed central spindle on which is fixed at least one annular collector extending around this central spindle. Each collector comprises two rings adapted and connected to each other so as to define between them one or more annular chambers, a first ring being fixed and mounted integrally on the central spindle whilst the second ring is integrally connected to the revolving assembly of the dwelling, this second ring being mounted so as to be capable of moving relative to the first ring at the same time as the revolving assembly. The first ring is provided with at least one transverse passage by means of which the or each annular chamber communicates with one or more fixed conduits. The second ring is also provided with at least one transverse passage by means of which the or each annular chamber communicates with one or more conduits of the revolving assembly.

With this system, individual collectors for the various conduits required in a dwelling, i.e. the supplies of water and fluids, outlets and electric cables, can easily be assembled in a totally autonomous manner whilst being easy to disconnect. Each individual collector may be constructed in a variety of forms perfectly adapted to the particular use envisaged. In this way, a modular system is provided which is extremely flexible for the purpose of adaptation and extension.

BRIEF DESCRIPTION OF THE DRAWINGS

The invention is explained in more detail with reference to some embodiments by way of example, which are in no way restrictive, shown in the accompanying drawings.

DESCRIPTION OF EXEMPLARY EMBODIMENTS

In FIGS. 1 to 4, reference A denotes the rotation axis of a revolving assembly, of which only the support frame 100 is shown. Extending coaxially with the axis A there is a fixed central spindle 10 consisting, for example, of a plurality of sections 10A, 10B, 10C, etc., joined end to end by means of connecting sleeves 11. Mounted on the central spindle 10 are a plurality of annular collectors in this case three collectors 20, 30, 40 which extend symmetrically around the spindle. There may be any desired number of collectors and in principle each of them is reserved for a particular use: for example, the collector 20 is used for a water inlet, the collector 30 for the discharge of waste water or sewage, and the collector 40 for the passage of an electric cable. The collectors 20, 30 40 are only schematically shown in FIG. 1, as they may take various forms in their construction, some typical examples of which are described hereinafter. At this point, it should merely be pointed out that all the collectors have a common arrangement in that they each comprise two elements of generally annular form which are coaxial with the central spindle 10. The collector 20 comprises elements 21 and 22, the collector 30 comprises elements 31 and 32 and the collector 40 comprises elements 41 and 42. The elements of each pair are joined together to define between them an annular chamber 50, 60, 70, respectively, which extends around the central spindle 10. The inner elements 21, 31, 41 are integrally mounted on the fixed central spindle 10 and are thus also fixed. The outer elements 22, 32 and 42 are integrally connected to the revolving assembly by attachment tabs 23, 33, and 43 and are thus carried along by the revolving assembly around the corresponding fixed elements. The attachment tabs are adjusted to ensure accurate alignment and adjustment of the outer rings relative to the inner rings. The annular chamber of each collector communicates on the one hand with a fixed conduit, via a transverse passage formed in the fixed inner element and on the other hand with at least one conduit of the revolving assembly, via at least one transverse passage formed in the movable outer element. In the drawings, three fixed conduits are shown, by way of an illustration: a water intake conduit 82 for connection to the collector 20, a waste water outlet conduit 83 for connection to the collector 30 and an electric cable duct 84 for connection to the collector 40. These fixed conduits extend upwards along the central spindle 10 and are connected to the transverse passages of the inner rings 21, 31, 41 of the corresponding collectors.

Figure 2:
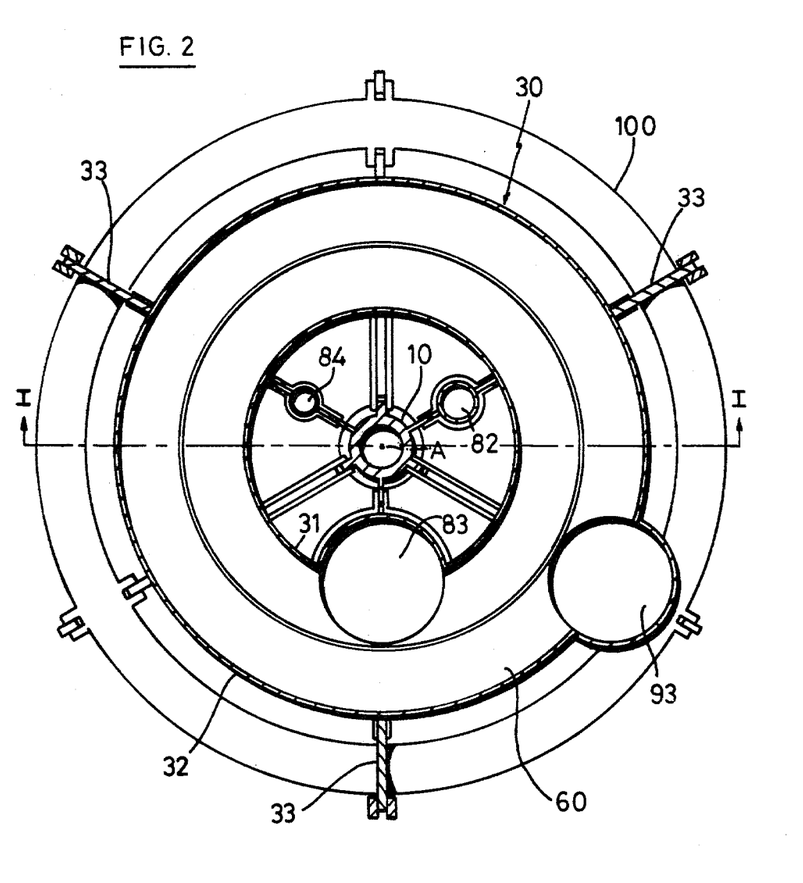
FIG. 2 is a view on the line II—II in FIG. 1.
Figure 3:
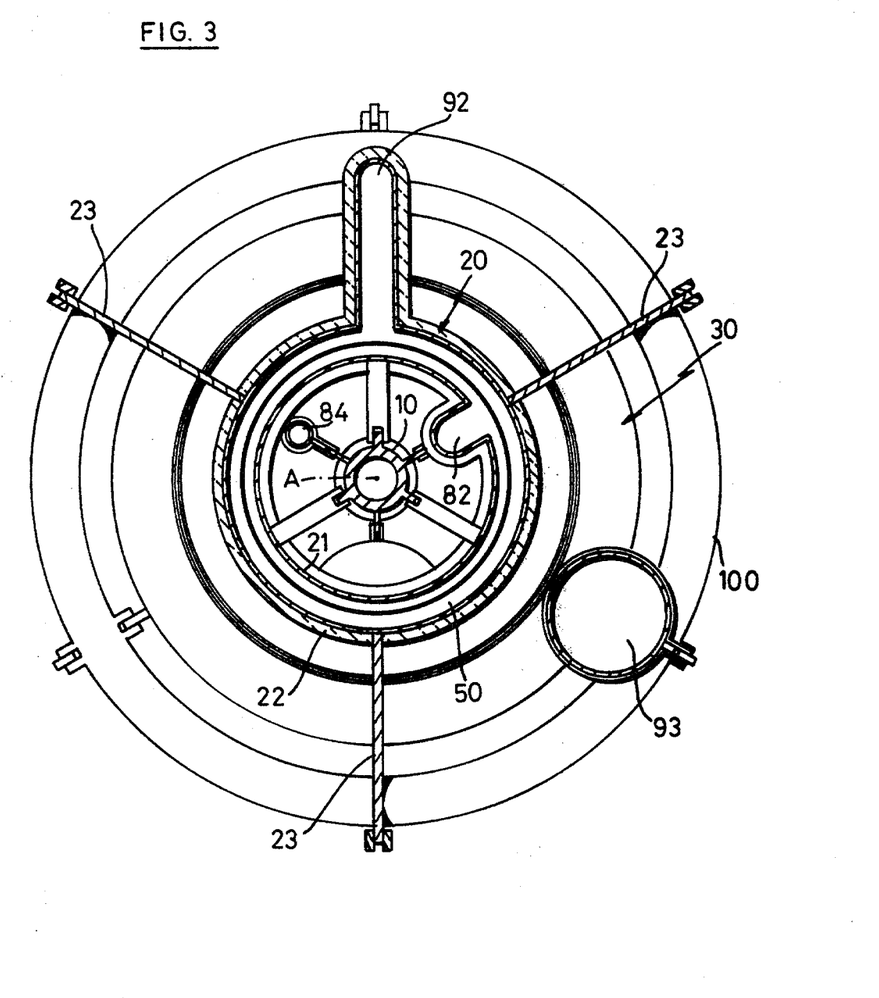
FIG. 3 is a view on the line III—III in FIG. 1.
Figure 4:
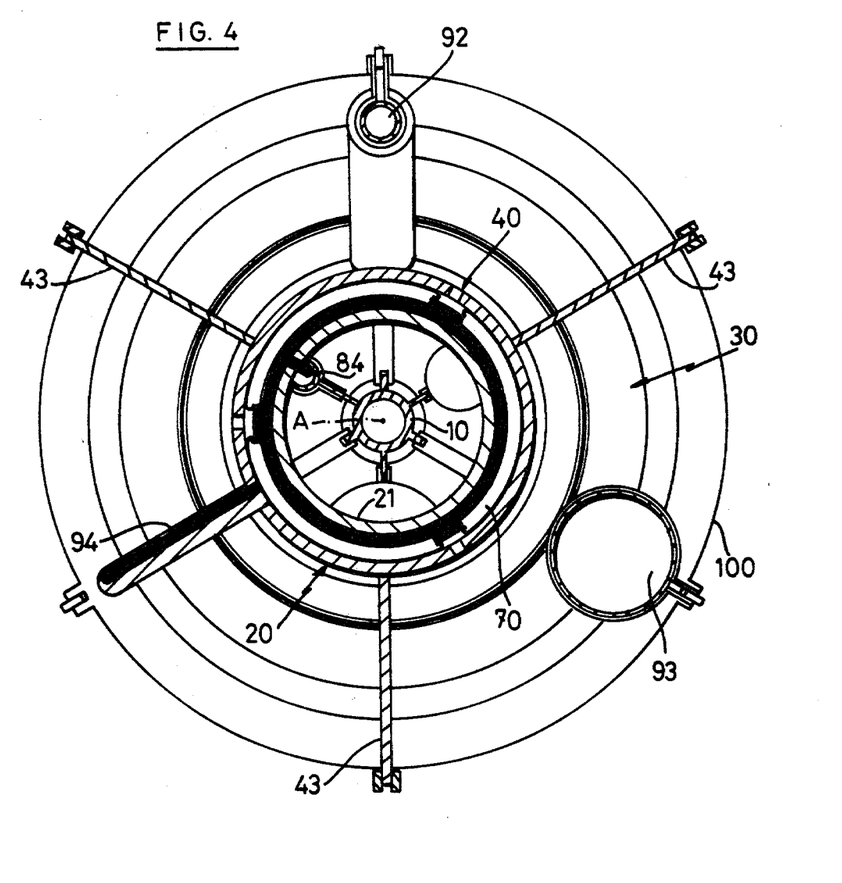
FIG. 4 is a view on the line IV—IV in FIG. 1.

Conduits integral with the revolving assembly are connected to the transverse passages provided in the outer rings 22,32,42 of the collectors, communicating with the annular chambers 50, 60, 70, respectively. FIGS. 2, 3 and 4 show a conduit 92 connected to the collector 20, a conduit 93 connected to the collector 30 and a conduit or duct 94 connected to the collector 40. These outer conduits, any desired number of which may obviously be provided, move with the revolving assembly around the rotation axis A and thus around the fixed inner rings of the collectors, thus remaining continuously in communication with the corresponding fixed conduits via the respective annular chambers 50, 60, 70.

In the structure thus formed according to the invention, not only is each circuit perfectly separate from the other, but it is also completely autonomous because it is associated with its own collector. The latter may be removed and replaced easily and rapidly, thus avoiding any long-term stoppage of operation. It is also very easy to add one or more collectors. In order to make the connection or disconnection of the collectors even simpler, the fixed conduits such as 82, 83, 84 may advantageously be provided at their bases with detachable connectors which can be adapted to corresponding connecting elements 85, 86 fixed to the tops of the main conduits or cables. Similarly, the conduits connected to the movable elements of the collectors, such as the conduits 92, 93, 94, may comprise, on top of the entire system of collectors, detachable connectors which can be adapted to connecting elements fixed to the ends of the conduits extending into the floors of the revolving dwelling. The system according to the invention thus solves all the problems mentioned hereinbefore and thus provides a practical and elegant solution for use in rotating or revolving dwellings.

Figure 1:
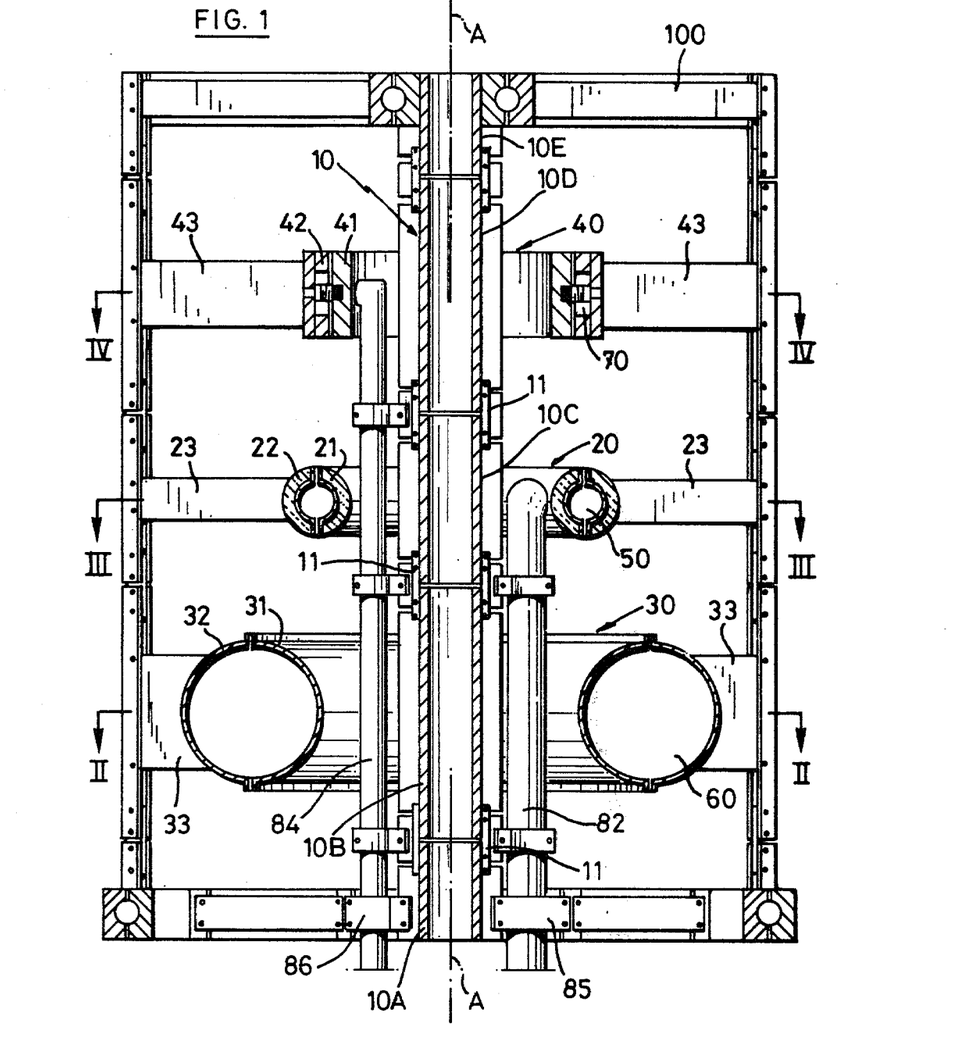
FIG. 1 is an axial section, on the line I—I in FIG. 2, through a first embodiment of the system according to the invention.
Figure 5:
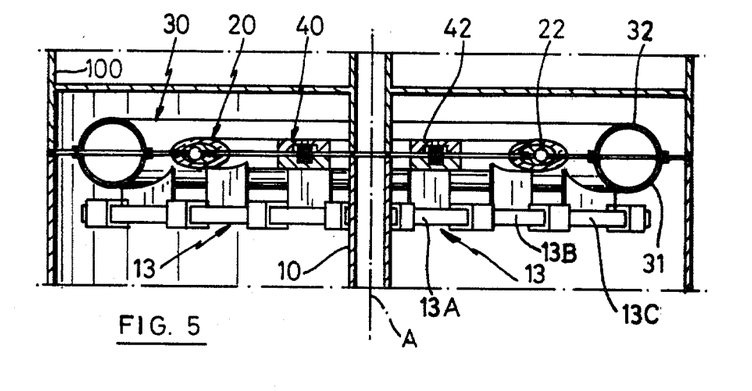
FIGS. 5 and 6 are an axial section and a plan view, respectively, of a variant of the embodiment in FIG. 1.
Figure 6:
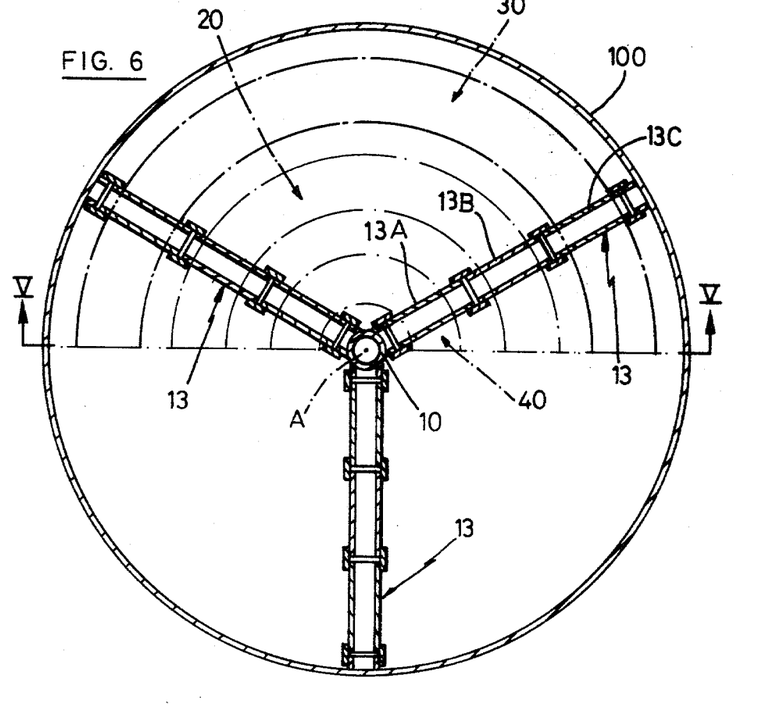

In the example shown in FIGS. 1 to 4, the fixed central spindle 10 advantageously consists of a plurality of superimposed sections 10A, 10B, etc., each carrying a separate, autonomous collector. Whilst remaining coaxial, the collectors may be mounted not in parallel planes as shown in FIG. 1 but concentrically, as shown in FIGS. 5 and 6. In this embodiment, the central vertical spindle 10 comprises radial arms 13 which support the coaxial concentric collectors (20, 30, 40), the constituent rings of which are superimposed. Here, too, the arms 13 may advantageously be made up of sections fixed end to end (13A, 13B, etc.) with each section carrying a separate collector.

Figure 7:
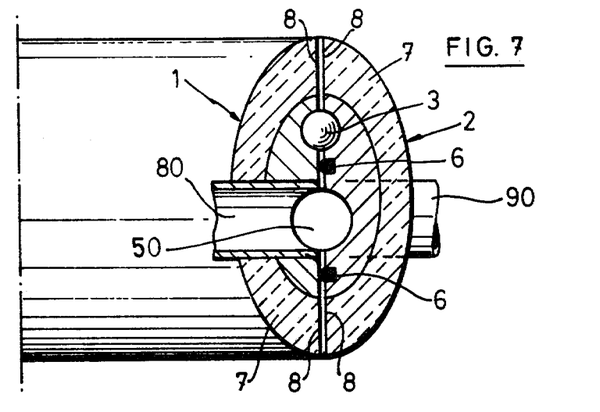
FIGS. 7 to 16 show some examples of embodiments of the annular collectors in the system according to the invention.

Now that the general structure of the system according to the invention has been described, there now follow a detailed description of the construction of an annular collector according to the invention, referring to FIG. 7 in particular. This drawing shows an axial section on the axis of a transverse inlet passage 80 in the right-hand half of the inner ring. The two coaxial rings 1 and 2 are shown: the ring 1 is the fixed ring which is to be mounted on the central spindle 10 and the ring 2 is the movable ring integral with the revolving assembly. The two rings have sections formed so as to have two vertical cooperating surfaces. When the two rings 1 and 2 are assembled, these vertical cooperating surfaces are formed so that they also define an annular chamber 50 which in this case is in fact a toric chamber into which the transverse passages 80 and 90 open. The passage 90 represented is shown in a position in which it is not located on the axis of the inlet passage 80. Reference numeral 3 designates one of the balls of a bearing advantageously provided in order to facilitate the rolling of the outer ring 2 on the periphery of the inner ring 1. Reference numeral 6 denotes sealing rings and reference numeral 7 denotes a separating sheath held in place by flaps 8. In this embodiment, which is suitable for an intake of water or fluid, the passages 80 and 90 are directed radially through the concentric rings 1 and 2. Some equivalent embodiments by way of example are shown in FIGS. 8 to 12.

Figure 8:
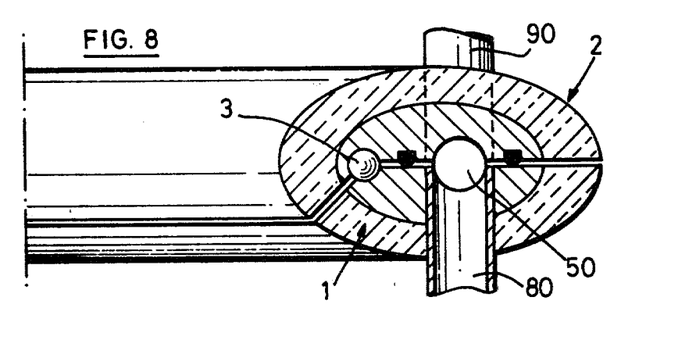
Figure 9:
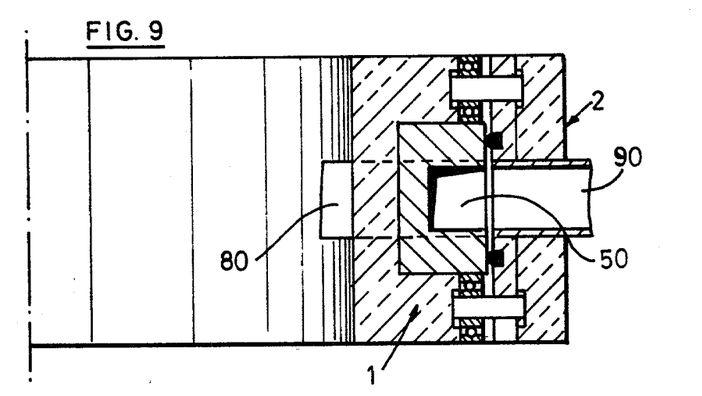
Figure 10:
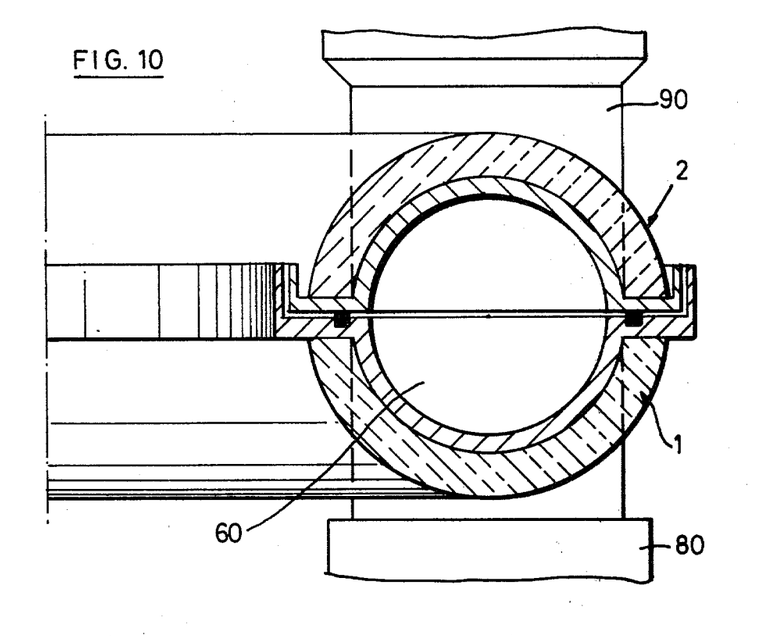
Figure 11:
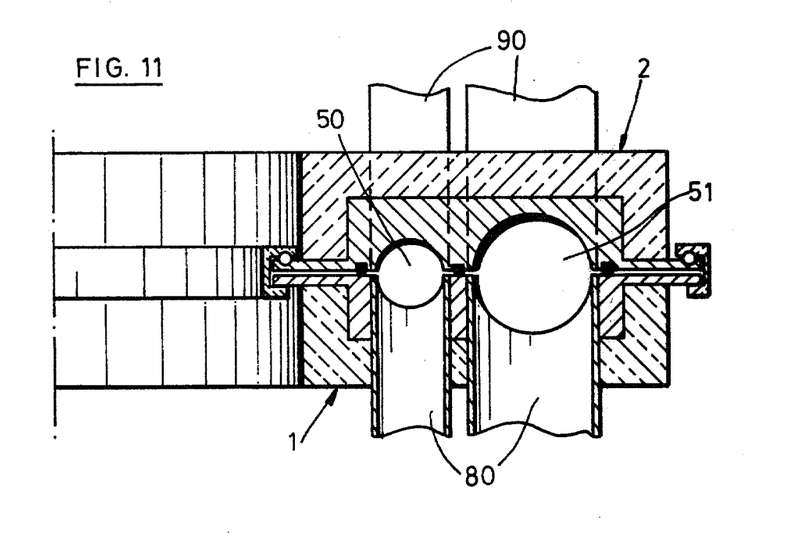
Figure 12:
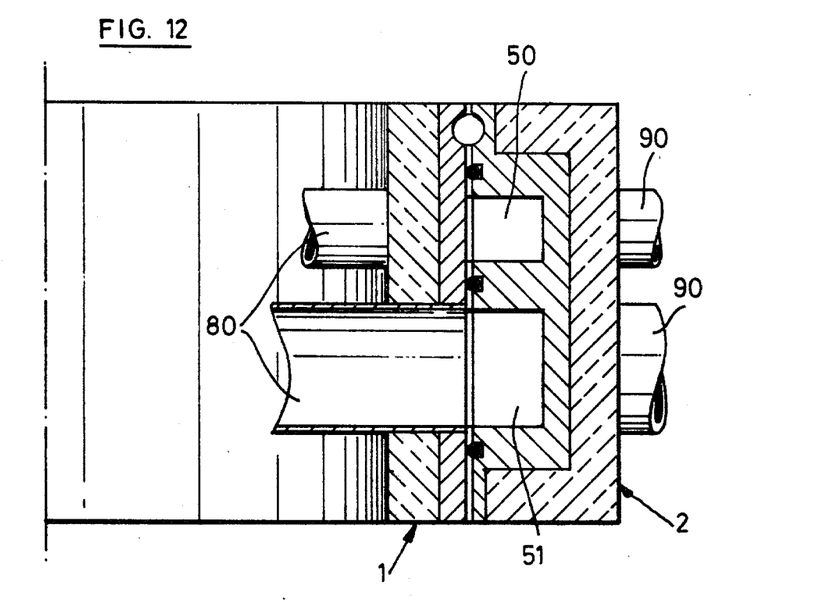

FIG. 8 corresponds substantially to FIG. 7 rotated through 90°. In this case, the movable ring 2 is set on and rolls on the fixed ring 1. FIG. 9 shows an embodiment in which the rings 1 and 2 have cross sections formed so as to define an annular chamber of rectangular cross section. In the embodiment illustrated in FIG. 10, the rings are circular in section and are superimposed with transverse passages 80 and 90 extending vertically. FIGS. 11 and 12 show two embodiments defining two annular chambers 50 and 51.

Figure 13:
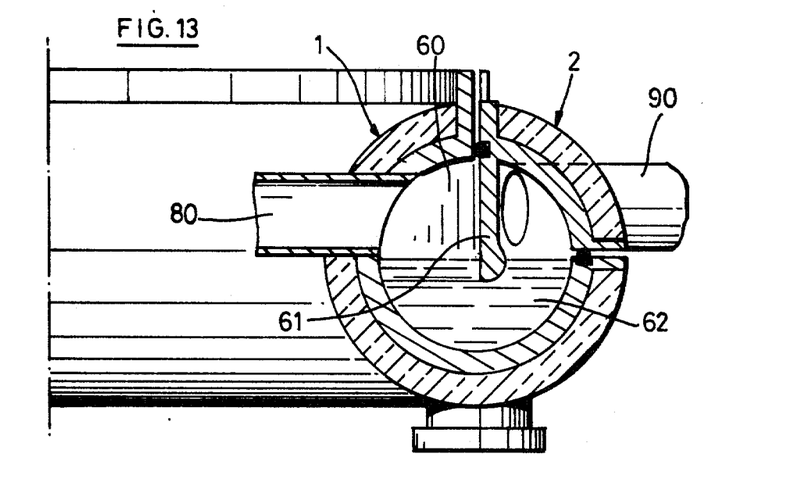

FIG. 13 shows an embodiment in which the ring 2 has a flap 61 which extends into the toric annular chamber 60 to form a siphon with water compartment 62. This embodiment is particularly intended for waste outlet circuits in order to prevent smells from rising.

Figure 14:
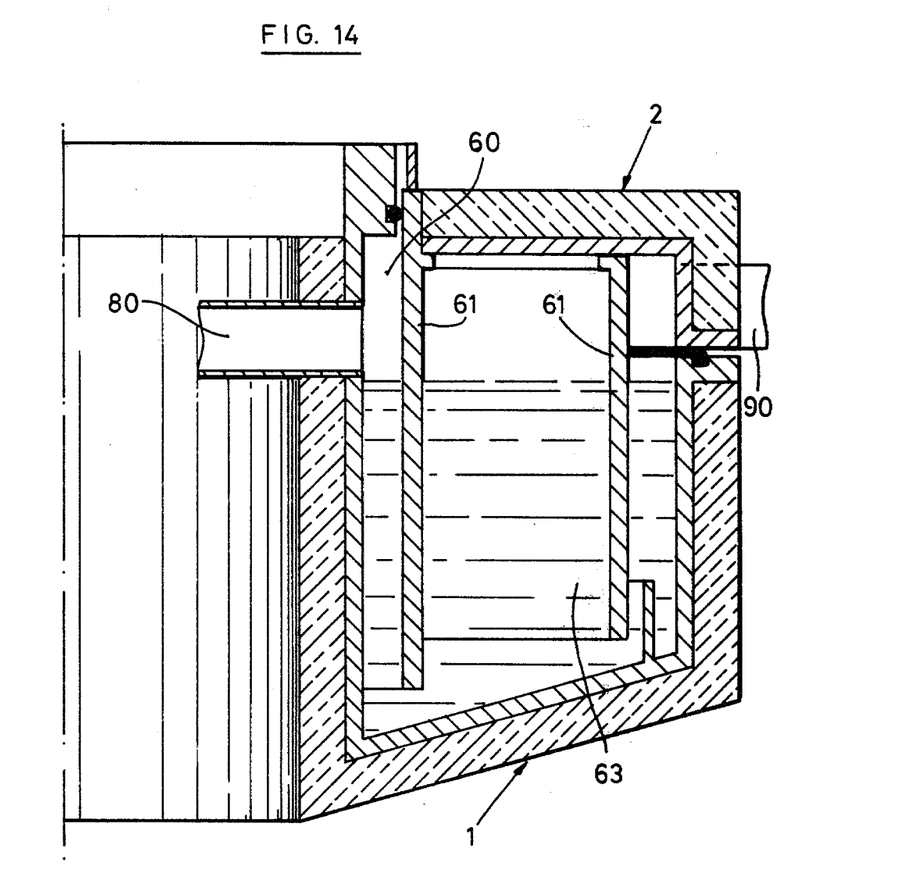

FIG. 14 shows an embodiment defining a grease trap 63 in the annular chamber 60. This arrangement makes it possible to trap the grease contained in the waste in cases where the grease might lead to the formation of fatty acids, which is prohibited by law in some countries. These examples show that the annular arrangement according to the invention readily lends itself to the various adaptations which might be required by the particular conditions of use.

Figure 15:
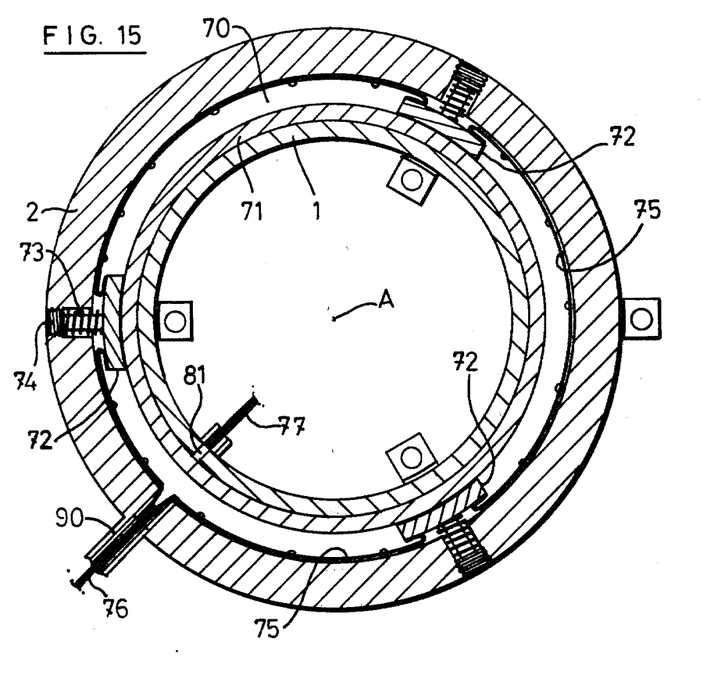
Figure 16:
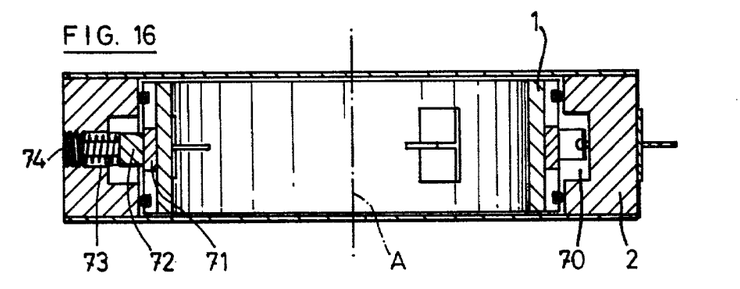

The apparatus according to the invention can also be used to accommodate electric cables. FIGS. 15 and 16 show a horizontal section and a vertical axial section respectively, through an exemplary embodiment. Here again, there are two coaxial rings 1 and 2 forming an annular chamber 70 between them. The rings 1 and 2 are made of an insulating material. On its outer surface, inside the chamber 70, the ring 1 comprises a ring 71 made of a material which conducts electricity. To make the drawings simpler, only one conducting ring 71 for the connection of an electric conductor is shown, but in practice a ring 71 will be provided for each conductor which is to be connected up. Each conductor of the supply cable 77 is connected to a pin 81 located in a passage 80 of the fixed ring 1 and making electrical contact with a separate ring 71. Collectors 72, also made of a material which conducts electricity, abut on the periphery of each conducting ring 71, these collectors being kept in contact with the ring 71 by springs 73 which are held under compression by stoppers 74 placed in openings formed in the ring 2. The collectors 72 are connected by cables 75, which are themselves connected to an output conductor 76 passing through the passage 90. Thus, excellent electrical contact is ensured by means of the collectors 72 which travel all along the periphery of the fixed ring 71 and rub against the outer surface thereof.

It goes without saying that the same arrangement may be adopted in a collector comprising two superimposed rings formed with vertical transverse passages.

It should also be understood that the examples described illustrate only some of the large number of possible embodiments arising from the same inventive concept.

What is claimed is:

1. System of collectors for conduits in a dwelling having an assembly revolving around a rotation axis, said system comprising:
    a fixed central spindle (10) extending coaxially with the rotation axis;
    an annular collector (20) comprising a first ring and a second ring, of any desired cross section, associated with each other so as to define at least one annular chamber (50) extending symmetrically about said rotation axis, the first ring (21) being fixed and integrally mounted on the fixed central spindle, and the second ring (22) being integral with the revolving assembly of the dwelling, said second ring being mounted on the first ring so as to be capable of moving relative to the first ring by rotating about said rotation axis;
    at least one first transverse passage (80) formed in the first ring to bring said annular chamber into communication with a fixed conduit;
    at least one second transverse passage (90) formed in the second ring to bring said annular chamber into communication with a conduit of the revolving assembly; and
    a plurality of further coaxial annular collectors (30, 40) extending in parallel planes perpendicular to the fixed central spindle, each of said further collectors comprising two concentric rings, wherein the fixed central spindle (10) comprises a plurality of sections fixed end to end (10A, 10B, . . . ) and wherein each collector is mounted on a separate spindle section.

2. System according to claim 1, wherein the first ring comprises, on its surface facing the second ring, at least one outer ring (71) of a material which conducts electricity, and wherein said second ring comprises, on its surface facing the first ring, a plurality of collectors (72) made of a material which conducts electricity, located opposite each outer conducting ring, said collectors being pressed against the surfaces of the corresponding conductor rings, each conductor ring (71) being connected to a conductor of a supply cable (77) through a transverse passage in the first ring, and the collectors associated with one conductor ring being electrically connected to one another and to an output conductor (76) through a transverse passage in the second ring.

3. System of collectors for conduits in a dwelling having an assembly revolving around a rotation axis, said system comprising:
    a fixed central spindle (10) extending coaxially with the rotation axis;
    an annular collector (20) comprising a first ring and a second ring, of any desired cross section, associated with each other so as to define at least one annular chamber (50) extending symmetrically about said rotation axis, the first ring (21) being fixed and integrally mounted on the fixed central spindle, and the second ring (22) being integral with the revolving assembly of the dwelling, said second ring being mounted on the first ring so as to be capable of moving relative to the first ring by rotating about said rotation axis;
    at least one first transverse passage (80) formed in the first ring to bring said annular chamber into communication with a fixed conduit;
    at least one second transverse passage (90) formed in the second ring to bring said annular chamber into communication with a conduit of the revolving assembly; and
    a plurality of further concentric annular collectors mounted on arms (13) which are integral with said fixed central spindle (10), each of said further collectors comprising two rings superimposed on each other, wherein the arms each comprise a plurality of sections fixed end to end (13A, 13B . . . ) and wherein each collector is mounted on a separate section of each of said arms.

4. System according to claims 1 or 3, wherein at least one annular collector comprises a plurality of superimposed annular chambers.

5. System according to claims 1 or 3, wherein at least one annular collector comprises a plurality of concentric annular chambers.

6. System according to claims 1 or 3, wherein one of the rings of at least one annular collector comprises an inner annular flap (61) forming a partition in at least one annular chamber so as to form a siphon.

7. System according to claims 1 or 3, wherein the rings of at least one annular collectors comprise two inner annular flaps (61) extending in at least one annular chamber so as to form a siphon and a grease trap.

* * * * *